Patented June 27, 1950

2,512,983

UNITED STATES PATENT OFFICE 2,512,983

MIXED CELLULOSE ESTERS AND PROCESS OF MAKING SAME

Remi G. Tritsmans and Serge P. Hendricx, Antwerp-Mortsel, Belgium, assignors to Gevaert Photo-Producten N. V., Antwerp-Mortsel, Belgium, a company of Belgium No Drawing. Application December 21, 1945, Serial No. 636,522

9 Claims. (Cl. 260—225)

This invention relates to organic mixed esters of cellulose and more especially to cellulose esters containing radicals of two or more organic acids, which esters possess not only high stability, but also outstanding mechanical properties which render them particularly fit for the manufacture of films used in photography.

As is well known to those skilled in the art, the fully esterified mixed organic esters such as the acetopropionates, acetobutyrates etc. produced for instance by acylating cellulose with a mixture containing propionic or butyric acid, or both, acetic anhydride and glacial acetic acid, while being soluble in certain solvent mixtures to form clear collodions, when cast for the production of films, yield comparatively brittle products of insufficient flexibility.

We have now found that mixed cellulose esters containing acetyl and propionyl or butyryl or both, which are not fully esterified, having only a total content of cellulose ester ranging between 94 and 97.5% and not more than 15% of the higher radical, and the balance being cellulose, i. e. a content of uncombined hydroxyl corresponding to 6–2.5% cellulose, all by weight of the mixed ester, when processed for the production of film, form products which, apart from having a high stability possess a favorable combination of tensile strength and elongation at breakage hitherto not attained as demonstrated by the subsequent examples.

In order to produce the new esters, we first prepare substantially fully esterified mixed organic esters in the known manner by reacting the constituents in a bath of a composition such that in the resulting ester the content of propionyl or butyryl or both does not materially exceed 15 per cent by weight of the product. We then proceed to treat this ester with an aqueous solution containing about from 5 to 15 per cent of an acid such as acetic or sulphuric acid. By this treatment the degree of esterification of the product is reduced to about 94–97.5 per cent. When this type of ester is then additionally treated with an inorganic and/or organic liquid containing a small proportion of an agent having an alkaline reaction, it possesses not only high stability, but also mechanical properties which are very much superior to those shown by any mixed cellulose esters hitherto made or described.

In United States Patent No. 2,119,116 to the present applicants jointly with Aladar Schuller it was found that by treating simple organic cellulose esters such as cellulose acetate in a two-stage process, first with a water solution containing from 0.1 to 1 per cent of an acid and then with a similarly dilute solution of a substance of alkaline reaction at elevated temperatures, the esters so treated became permanently stable. However their mechanical properties such as tensile strength and elongation were still unsatisfactory.

We were greatly surprised when we found that by increasing the concentration of the acid solution used in the first step of the present process, we were able to impart to the esters greatly enhanced mechanical properties without damaging their stability. This result appeared inexplicable in view of the fact, found by analysis, that by using a concentrated acid solution we had brought about, simultaneously with partial hydrolysation, also a slight destruction of the molecule which per se would be expected to reduce the mechanical strength of the products.

The mixed esters after treatment according to the new process were found to have a total cellulose ester content ranging between 94 and 97.5 per cent and a content of uncombined hydroxyl corresponding to 6–2.5 per cent cellulose (all by weight of the mixed esters). It could not be foreseen that the treatment with a stronger acid solution, instead of weakening the products mechanically, would very materially increase their mechanical resistivity.

We also found that the partial hydrolysation of the molecule could not be carried beyond the limits indicated above without a loss of desirable mechanical properties.

We further found that the favorable mechanical properties were obtainable only with acetomixed esters whose content of higher acyl (propionyl or butyryl or both) does not exceed 15 per cent by weight of the mixed ester.

The following examples are intended to illustrated some ways of carrying our invention into effect, without however in any way limiting its scope:

Example I 100 parts (by weight) cotton linters were introduced into an esterifying bath comprising 300 parts acetic anhydrid, 100 parts butyric anhydrid, 100 parts acetic acid, 100 parts butyric acid, 900 parts solvent naphtha and 2 parts sulphuric acid (sp. gr. 1.84). This mixture was heated for 12 hours at 35° C. The mixed aceto-butyric cellulose ester resulting from this treatment was freed from the adhering liquid by centrifuging and after thorough washing with water was introduced into an aqueous 7.5 per cent sulphuric acid solution heated to about 90–100° C.

After the lapse of about 2 hours, the ester was separated from the hot liquid by centrifuging and, after washing with water, was introduced at room temperature into a 0.1 per cent aqueous solution of potash in which it was left for ten hours at room temperature.

The ester, when separated from the liquid by centrifuging and washing with water and dried was subjected to the usual tests to ascertain its chemical and mechanical properties. It was found to be esterified 94.1 per cent and to contain 39.1 per cent acetyl and 3.96 per cent butyryl, corresponding to 87.2 per cent of acetic acid ester and 6.9 per cent of butyric acid ester. The final mixed cellulose ester possessed a perfect stability, since it showed no colouring after heating 2 hours at 200° C. Film cast from this ester had a tensile strength of 8.5 kg./sq. mm. and an elongation at breakage of 34 per cent.

*Example II*

100 parts cotton linters were introduced into an esterifying bath comprising 300 parts acetic anhydrid, 300 parts butyric acid, 900 parts solvent naphtha and 1.5 parts sulphuric acid (sp. gr. 1.84). After 8 hours heating at 40° C. the esterification reaction was complete.

The ester was now freed from the liquid by centrifuging and washing with water and placed in an aqueous solution containing 10 per cent acetic acid and 3 per cent sulphuric acid. After having remained in this solution for 10 hours at a temperature of 80° C., the ester was withdrawn and freed from the adhering liquid, placed in an aqueous solution containing 0.1 per cent ammonia and left therein for 5 hours at a temperature of 50° C. After washing and drying the ester was found to contain 33.7 per cent acetyl and 12.3 per cent butyryl (corresponding to 75.2 per cent of acetic acid ester and 21.6 per cent of butyric acid ester). Its degree of esterification was 96.8 per cent.

From this acetobutyrate a film possessing a tensile strength of 8.3 kg./sq. mm. and an elongation of 37 per cent was formed.

*Example III*

100 parts cotton linters were introduced into an esterifying bath containing 400 parts propionic acid, 300 parts acetic anhydrid, 800 parts toluol and 2 parts sulphuric acid (sp. gr. 1.84). After 24 hours heating at 30° C., the esterification reaction was complete.

The ester was freed from the liquid both by centrifuging and washing with water and placed in an aqueous solution containing 5 per cent sulphuric acid. After having remained in this solution for 4 hours at a temperature of 70° C., the ester was withdrawn, freed from the adhering liquid, placed in an aqueous solution containing 1.0 per cent ethyl amine and left therein for 10 hours, at a temperature of 40° C. After washing and drying, the ester was found to contain 31.9 per cent acetyl and 12.95 per cent propionyl (corresponding to 71.2 per cent acetic acid ester and 25.0 per cent propionic acid ester). This mixed ester had a degree of esterification of 96.2 per cent. It was found to show a tensile strength of 9.5 kg./sq. mm. and an elongation at breakage of 28 per cent. No colouring occurred after heating at 200° C. during 2 hours.

*Example IV*

100 parts cotton linters were introduced into an esterifying bath comprising 750 parts solvent naphtha, 400 parts acetic anhydrid, 100 parts acetic acid, 150 parts butyric acid, 100 parts propionic acid and 3 parts sulphuric acid (sp. gr. 1.84). After 6 hours at 50° C., the esterification reaction was complete.

The mixed aceto-propionic-butyric ester thus formed was freed from the adhering liquid by centrifuging. After thorough washing with water, the ester was introduced into an aqueous 5 per cent solution of acetic acid and heated to about 100° C. After another 4 hours heating, it was separated from the hot liquid by centrifuging and after washing with water placed at 40° C. into a 0.5 per cent aqueous solution of ammonia and kept therein for 12 hours. The ester after being separated from the liquid by centrifuging and washed and dried, was subjected to the usual tests. It was found to contain 40.4 per cent acetyl, 1.81 per cent propionyl and 2.77 per cent butyryl (corresponding to 90.2 per cent acetic acid ester, 2.7 per cent propionic acid ester and 3.9 per cent butyric acid ester). It thus had a cellulose mixed ester content of 96.8 per cent. The test of stabilization showed no colouring after a heating of 2 hours at 200° C. Film made from this aceto-propionic-butyric-acid ester possessed a tensile strength of 9.7 kg./sq. mm. and an elongation of 33 per cent.

As inorganic acids we may use for instance aqueous 5–15 per cent solutions of sulphuric acid, hydrochloric acid, phosphoric acid, perchloric acid, etc., and as organic acids besides acetic acid also formic acid, propionic acid, citric acid and oxalic acid.

The agents of alkaline reaction may be ammonia or an amine, for instance dimethylamine or a compound such as the hydroxide, carbonate or the like, of an alkali metal, for instance a carbonate, of potash, lithium or sodium, which may be dissolved in water or in a volatile organic solvent, for instance alcohol.

Instead of cellulose, a cellulose compound may be used as starting material.

Various changes may be made in the details disclosed in the foregoing specification without departing from the invention or sacrificing the advantages thereof.

We claim:

1. Cellulose mixed esters including aceto radicals and higher acyl radicals and selected from the class consisting of aceto-propionate esters, aceto-butyrate esters and aceto-propionate-butyrate esters, having an ester content between 94 and 97.5%, and a higher acyl content not exceeding 15% of the mixed ester and a content of uncombined hydroxyl corresponding to 6–2½% cellulose (all by weight of the mixed ester).

2. A film of the ester of claim 1 having a tensile strength of at least 8.3 kg./sq. mm. and an elongation at breakage of at least 28%.

3. Cellulose mixed ester having an aceto-propionate content ranging between 94 and 97.5%, a propionyl content not exceeding 15% and a content of uncombined hydroxyl corresponding to 6–2.5% cellulose (all by weight of the mixed ester).

4. Cellulose mixed ester having an aceto-butyrate content ranging between 94 and 97.5%, a butyryl content not exceeding 15% and a content of uncombined hydroxyl corresponding to 6–2.5% cellulose (all by weight of the mixed ester).

5. Cellulose mixed ester having an aceto-propionate-butyrate content ranging between 94 and 97.5%, a propionyl-butyryl content not exceeding 15% and a content of uncombined hydroxyl corresponding to 6–2.5% cellulose (all by weight of the mixed ester).

6. A process of making mixed cellulose esters of great stability, imparting to products made therefrom great mechanical strength, which comprises preparing a fully esterified cellulose mixed ester including aceto radicals and higher acyl radicals and selected from the class consisting of aceto-propionate esters, aceto-butyrate esters and aceto-propionate-butyrate esters having a higher acyl content not exceeding 15% of the mixed ester and treating said fully esterified product several hours at a temperature ranging between 70° and 100° C. with an acid solution containing from 5 to 15% acid and thereafter with a dilute solution of alkaline substance.

7. The process of making mixed cellulose esters of great stability imparting to products made therefrom great mechanical strength, which comprises preparing a fully esterified cellulose acetopropionate having a propionyl content not exceeding 15% by weight of the mixed ester and treating said fully esterified product several hours at a temperature ranging between 70° and 100° C. with an acid solution containing from 5 to 15% acid and thereafter with a dilute solution of an alkaline substance.

8. The process of making mixed cellulose esters of great stability imparting to products made therefrom great mechanical strength, which comprises preparing a fully esterified cellulose acetobutyrate having a butyryl content not exceeding 15% by weight of the mixed ester and treating said fully esterified product several hours at a temperature ranging between 70° and 100° C. with an acid solution containing from 5 to 15% acid and thereafter with a dilute solution of an alkaline substance.

9. The process of making mixed cellulose esters of great stability imparting to products made therefrom great mechanical strength, which comprises preparing a fully esterified cellulose acetopropionate-butyrate having a propionyl-butyryl content not exceeding 15% by weight of the mixed ester and treating said fully esterified product several hours at a temperature ranging between 70° and 100° C. with an acid solution containing from 5 to 15% acid and thereafter with a dilute solution of an alkaline substance.

REMI G. TRITSMANS.
SERGE P. HENDRICX.

REFERENCES CITED

The following references are of record in the file of this patent:

UNITED STATES PATENTS

| Number | Name | Date |
|---|---|---|
| 1,823,350 | Clarke | Sept. 15, 1931 |
| 2,000,934 | Dreyfus et al. | May 14, 1935 |
| 2,101,994 | Fordyce | Dec. 14, 1937 |
| 2,119,116 | Schuller | May 31, 1938 |
| 2,139,663 | Bley | Dec. 13, 1938 |
| 2,346,498 | Malm et al. | Apr. 11, 1944 |